United States Patent [19]

Kelman

[11] Patent Number: 5,169,204
[45] Date of Patent: Dec. 8, 1992

[54] ENERGY ABSORBING INNER DOOR PANEL WITH FASTENERS TO ABSORB BODY IMPACT ENERGY

[75] Inventor: Josh Kelman, Dover, N.H.
[73] Assignee: Davidson Textron Inc., Dover, N.H.
[21] Appl. No.: 865,298
[22] Filed: Apr. 8, 1992
[51] Int. Cl.⁵ .................. B60J 5/04; B60R 21/04
[52] U.S. Cl. ...................... 296/146 D; 296/189; 49/502; 280/751
[58] Field of Search ............ 296/146 D, 146 C, 189, 296/39.1; 49/502; 280/751

[56] References Cited

U.S. PATENT DOCUMENTS

| | | | |
|---|---|---|---|
| 3,989,275 | 11/1976 | Finch | 280/751 |
| 4,890,877 | 1/1990 | Ashtiani-Zarandi et al. | 296/146 |
| 5,048,234 | 9/1991 | Lau et al. | 49/502 |
| 5,102,163 | 4/1992 | Ishikawa | 280/751 |

*Primary Examiner*—Robert R. Song
*Attorney, Agent, or Firm*—Reising, Ethington, Barnard, Perry & Milton

[57] ABSTRACT

A vehicle door system (10) for reducing the impact of a person against the door when the vehicle undergoes a side impact. The system includes an inner door panel (14) mounted to a door frame (12) in spaced apart fashion. The inner panel (14) is mounted to the frame (12) with a plurality of shock absorbing fasteners (20) which absorbs some of the kinetic energy transmitted from the door frame to the person.

10 Claims, 2 Drawing Sheets

ENERGY ABSORBING INNER DOOR PANEL WITH FASTENERS TO ABSORB BODY IMPACT ENERGY

TECHNICAL FIELD

The subject invention relates to a vehicle door system for absorbing kinetic energy generated from a side impact to the vehicle.

BACKGROUND OF THE INVENTION

Practitioners of the vehicle door art concern themselves with reducing the impact of a person against the inner panel of a door. Such impact often occurs when the vehicle is impacted from the side by another vehicle, forcing the person suddenly and violently against the inner panel of the door. Ideally, the inner panel of the door will include an absorbing system sufficient to dissipate a substantial part of the kinetic energy of the person hitting the panel. It is well known in the art to make interior trim parts such as the arm rest with soft or collapsible material in order to absorb the kinetic energy of the person hitting the interior part of the vehicle. The U.S. Pat. No. 4,890,877 to Ashtiani-Zarandi et al teaches a system including the placement of shock absorbing material between the inner trim panel and the more solid parts of the door, including the frame. This material, a sheet of fabric with a plurality of soft cone structures, cushions the person and the inner panel as both move toward the door frame. Certainly there could be other effective ways to reduce the impact of a passenger against the inner panel of the door.

SUMMARY OF THE INVENTION AND ADVANTAGES

An energy absorbing vehicle door comprises a door frame, an inner panel and fastening means for fastening the inner panel to the door frame and for maintaining the inner panel a predetermined distance away from the door frame. The invention is characterized by the fastening means including energy absorbing means for absorbing kinetic energy of the inner panel moving toward the frame while subject to any force tending to reduce the predetermined distance.

Since the panel is spaced apart from the frame with fasteners which absorb energy, this further reduces the energy of the vehicle door impacting the person. These fasteners can be used in combination with other shock absorbing means to cushion the impact of the door hitting the passenger, or vice-versa.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
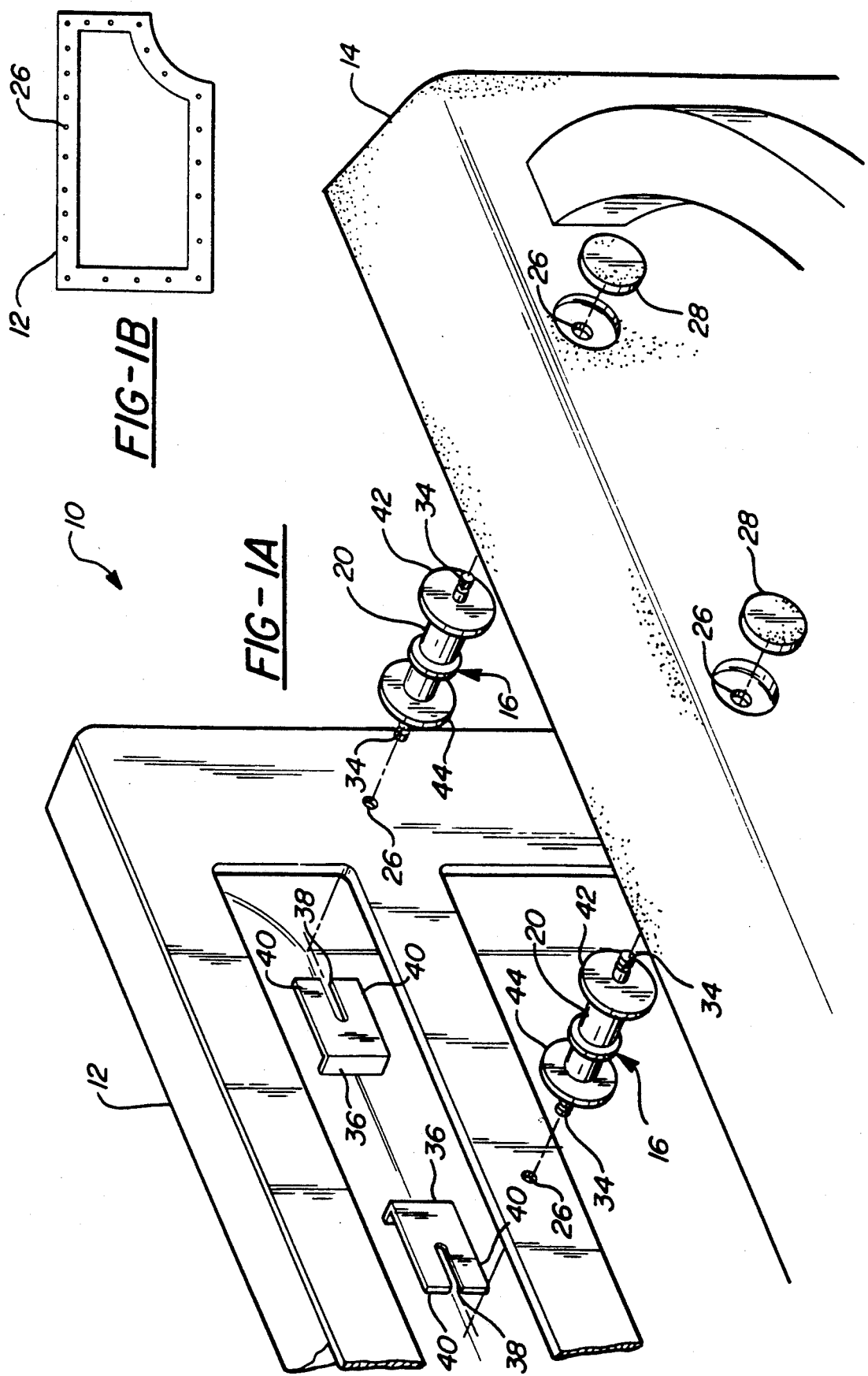
FIG. 1a is an exploded perspective view of the subject fasteners used in connection with a door panel and a door frame.
FIG. 1b is a front view generally showing the door frame.

An energy absorbing vehicle door generally shown at 10 comprises a door frame 12, an inner panel 14 and fastening means 16 for fastening the inner panel to the door frame 12 and for maintaining the inner panel 14 a predetermined distance away from the door frame 12. The invention is characterized by the fastening means 16 including energy absorbing means 18 for absorbing kinetic energy of the inner panel 14 moving toward the frame 12 while subject to any force tending to reduce the predetermined distance.

The fastening means 16 includes a plurality of fasteners 20 spaced apart from one another between the inner panel 14 and the frame 12. The fasteners 20 each include a shaft 22 having axes extending perpendicular to the inner panel 14 and the frame 12. The shafts 22 each include damping means 24 for damping axial forces along the shaft 22.

The inner panel 14 includes a plurality of spaced apart fastener holes 26 through the panel from an outer face to an inner face.

The frame 12 includes a plurality of spaced apart fastener holes 26 through the frame extending from an outer face to an inner face and oppositely disposed from fastener holes 26 through the inner panel 14 when the inner panel and the frame 12 are aligned for fastening.

The fastener holes 26 are spaced apart along the respective peripheries of the frame 12 and the panel 14, and the holes in the frame 12 align with the holes in the panel 14 when the panel and frame 12 are aligned in spaced apart fashion. The panel 14 is not fastened to the frame 12 anywhere but along the perimeter; in other words the center of the panel 14 is unfastened, and generally free to flex toward the frame 12.

Each shaft 22 of each of the fasteners 20 extends through the oppositely disposed fastener holes 26. The shafts 22 of the fasteners 20 can be attached to the inner door panel 14 and the frame 12 in any number of ways. Two such ways are shown in FIG. 1. First, a cap 28 may snap over the end of the shaft 22 which extends through the fastener holes 26. The cap 28 has a hole 30 for receiving the shaft end, and the hole includes an annular ridge 32 extending toward the center of the hole 30. The end of the shaft 22 has a corresponding annular groove 34. The ridge 32 snaps into engagement with the annular groove 34 when the end of the shaft 22 is inserted into the hole in the cap 28.

In a second situation, the shaft 22 fastens to the frame 12 or panel 14 by means of a locking piece 36 having a slit 38 formed therein. The slit 38 defines two spaced apart fingers 40. The fingers 40 slide into engagement with the annular groove 34 formed in the end of the shaft 22, and prevent the end of the shaft from moving relative to the door frame 12.

There are a number of other ways to attach the fastener 20 to the door panel 14 and the frame 12. For example, half of the fastener 20 could be molded to the frame 12 and the other half could be molded to the door panel 14. The two halves could then be joined by snapping together, by gluing or by welding. Speaking in very general terms, most embodiments of the fasteners 20 have similar elements: each of the shafts 22 includes a first enlargement 28 disposed adjacent the outer face of the inner panel 14, a second enlargement 42 disposed further along the shaft 22 adjacent the inner face of the inner panel 14, a third enlargement 44 disposed along the shaft 22 adjacent the inner face of the frame 12 and a fourth enlargement 36 disposed along the shaft 22 adjacent the outer face of the frame 12. The first and second enlargements 28,42 retain the shaft 22 to the inner panel 14, while the third and fourth enlargements 44,36 retain the shaft 22 to the frame 12. The second enlargement 42 is typically an annular flange molded as part of the fastener shaft 22.

There are several possible embodiments of the fasteners 20 which could include damping means 24 along the shaft 22. In one embodiment, the damping means 24 comprises the third enlargement 44 being adapted to compress radially in order to enable the shaft 22 to slide through the hole in the frame 12 under a predetermined force. The fastener holes 26 in the frame 12 in this embodiment are special holes being frustoconical in shape. The third enlargement 44 is actually a hemispherical or half cylinder-shaped object made from an elastic material such as rubber. In this way the force pushing the fastener through the fastener hole 26 in the frame 12 is resisted by the third enlargement 44 until the enlargement compresses radially toward the shaft 22 enough to fit through the fastener hole 26 in the frame 12. The enlargement 44 is attached to the shaft 22 by molding, by gluing, or by other appropriate means.

Figure 2:
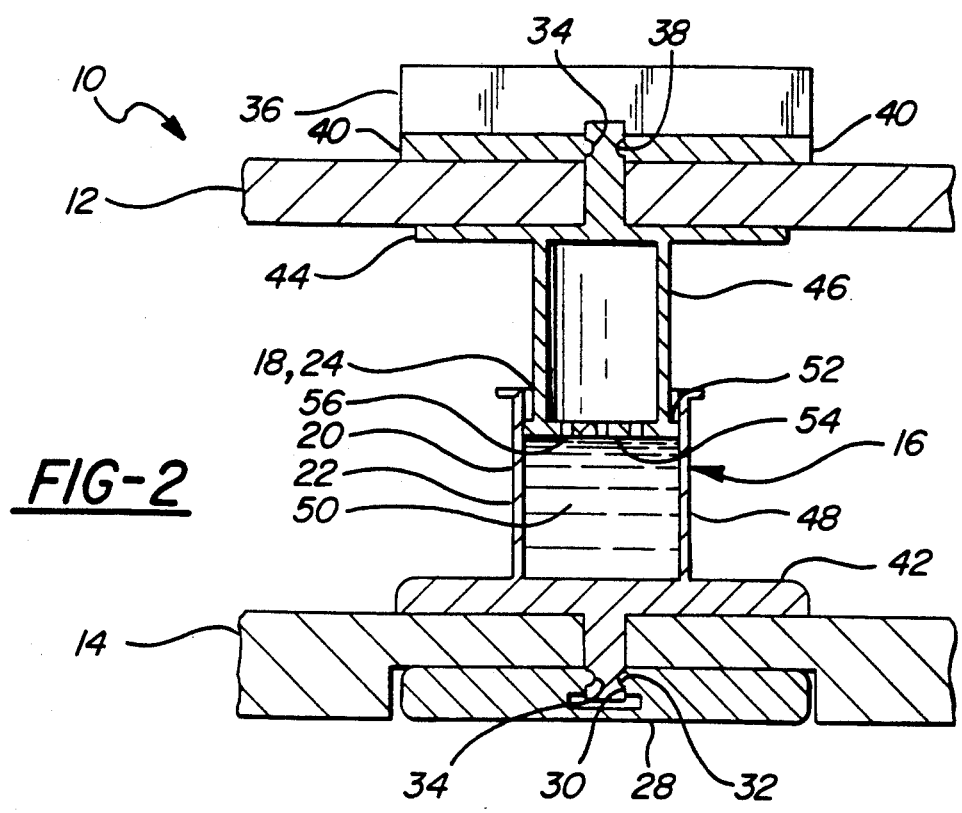
FIG. 2 is a side view of one embodiment of the subject fastener in cross section.
Figure 3:
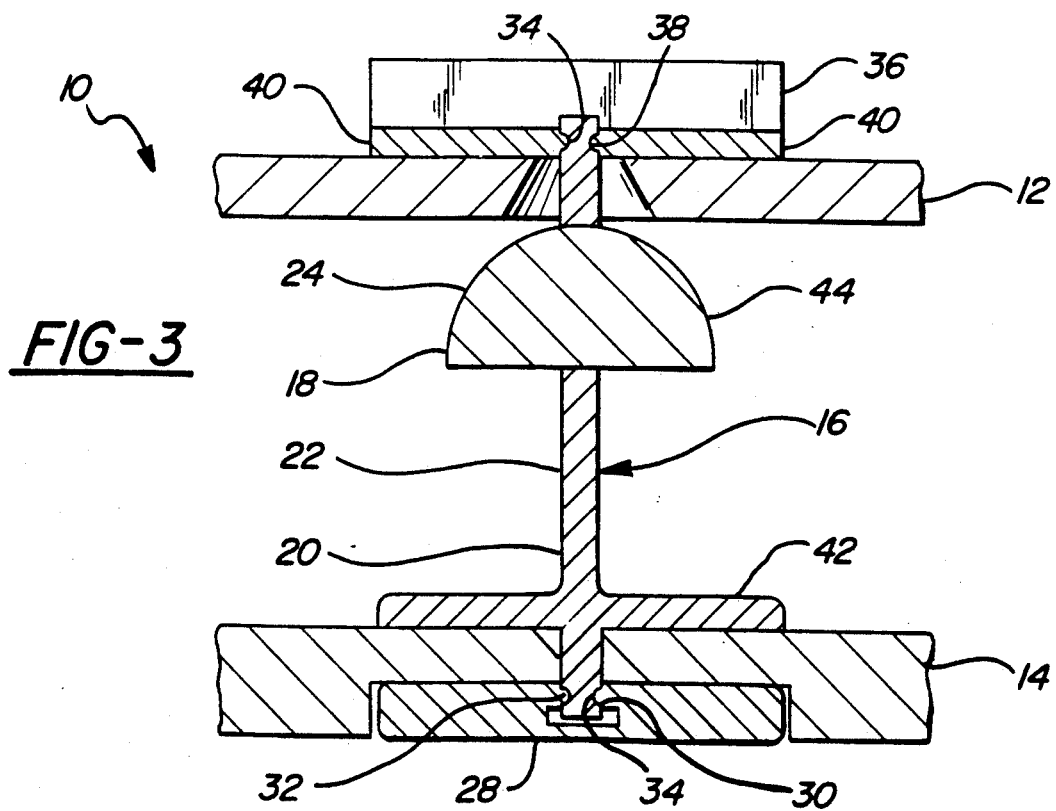
FIG. 3 is a side view of a second embodiment of the subject fastener in cross section.

In an alternative embodiment, the damping means 24 may comprise the shaft 22 having a piston member 46 partially telescoping within a cylinder member 48, and resisting means 50 for resisting fuller telescoping engagement of the piston within the cylinder. The resisting means 50 comprises a viscous liquid disposed within the cylinder 48. In the preferred embodiment, the viscous liquid is a gelatin. This embodiment is much like a shock absorber used in the suspension of a car. Under a force tending to push the panel 14 and the frame 12 together, the piston 46 and the cylinder 48 move into fuller telescoping engagement subject to the resistance of the gel. Since the gel is incompressible, some provision must be made for it to slowly escape between the piston 46 and the cylinder 48. In one embodiment of this assembly, the piston 46 may include an annular flange 52 which contacts the inner part of the cylinder 48. The flange 52 includes one or more orifices (not shown) through it to enable the gel or other liquid to pass through. In another embodiment, shown in FIG. 2, the piston 46 has a top plate 54 which closes the top end of the piston. The plate 54 has a plurality of orifices 56 therethrough which enable the liquid to pass slowly from the cylinder 48 into the piston 46.

In another embodiment the resisting means 50 could be a spring placed between the piston's top plate 54 and the end of the cylinder 48 adjacent the second enlargement.

The invention has been described in an illustrative manner, and it is to be understood that the terminology which has been used is intended to be in the nature of words of description rather than of limitation.

In operation, when a person hits the inner panel 14 of the door (or when the inner panel hits the person) the panel will move toward the frame 12 subject to the cushioning action of the fasteners 20 and whatever cushioning material, if any, is placed between the frame and the inner panel. The cushioning fasteners will absorb part of the force of the impact between person and panel, and reduce the possibility of injury to the person.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. An energy absorbing vehicle door (10) comprising:
a door frame (12);
an inner panel (14);
fastening means for fastening said inner panel (14) to said door frame (12) and for maintaining said inner panel a predetermined distance away from said door frame (12);
characterized by said fastening means (16) including energy absorbing means (18) for absorbing kinetic energy of said inner panel (14) moving toward said frame (12) while subject to any force tending to reduce said predetermined distance.

2. An assembly as set forth in claim 1 further characterized by said fastening means (16) including a plurality of fasteners (20) spaced apart from one another between said inner panel (14) and said frame (12).

3. An assembly as set forth in claim 2 further characterized by said fasteners (20) each including a shaft (22) having an axis extending perpendicular to said inner panel (14) and said frame (12), said shafts (22) each including damping means (24) for damping axial forces along said shaft.

4. An assembly as set forth in claim 3 further characterized by said inner panel (14) including a plurality of spaced apart fastener holes (26) through said panel (14) from an outer face to an inner face.

5. An assembly as set forth in claim 4 further characterized by said frame (12) including a plurality of spaced apart fastener holes (26) through said frame (12) from an outer face to an inner face and oppositely disposed from said fastener holes (26) through said inner panel (14) when said inner panel and said frame (12) are aligned for fastening.

6. An assembly as set forth in claim 5 further characterized by each shaft (22) of each of said fasteners (20) extending through said oppositely disposed holes (26), each of said shafts (22) including a first enlargement (28) disposed adjacent said outer face of said inner panel (14), a second enlargement disposed (42) further along said shaft (22) adjacent said inner face of said inner panel (14), a third enlargement (44) disposed along said shaft (22) adjacent said inner face of said frame (12) and a fourth enlargement (36) disposed along said shaft (22) adjacent said outer face of said frame (12), said first and second enlargements (28,42) retaining said shaft (22) to said inner panel (14), said third and fourth enlargements (44,36) retaining said shaft to said frame (12).

7. An assembly as set forth in claim 6 further characterized by said damping means (24) comprising said third enlargement (42) being adapted to compress radially in order to enable said shaft (22) to slide through said hole (26) in said frame (12) under a predetermined force.

8. An assembly as set forth in claim 6 further characterized by said damping means (24) comprising said shaft (22) having a piston member (46) partially telescoping within a cylinder member (48), and resisting means (50) for resisting fuller telescoping engagement of said piston within said cylinder member.

9. An assembly as set forth in claim 8 further characterized by said resisting means (50) comprising a viscous liquid disposed within said cylinder member (48).

10. An assembly as set forth in claim 9 further characterized by said viscous liquid being a gelatin.

* * * * *